United States Patent Office 3,226,337
Patented Dec. 28, 1965

3,226,337
PROCESS FOR PRODUCING A CATALYST FOR THE OXIDATION OF OLEFINS AND DIOLEFINS TO UNSATURATED DICARBOXYLIC ACIDS
Wilhelm Riemenschneider, Ulrich Pintschovius, and Otto Probst, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 12, 1961, Ser. No. 158,864
Claims priority, application Germany, Dec. 24, 1960, F 32,841
4 Claims. (Cl. 252—435)

The present invention relates to a catalyst suitable for use in the oxidation of olefins and/or diolefins having 4 carbon atoms in a straight chain with molecular oxygen to aliphatic olefinically unsaturated dicarboxylic acids and to a process for its manufacture.

It is known that aliphatic dicarboxylic acids having 4 carbon atoms in a straight chain, such as maleic acid, can be prepared by catalytic oxidation of hydrocarbons having the same number of carbon atoms. The preferred hydrocarbons include primarily olefins and diolefins, i.e., butene and butadiene, for example, for the manufacture of maleic acid. In this process, the hydrocarbons are mixed with gases containing elementary oxygen, such as air, and the resulting mixture is passed at a raised temperature over an oxidation catalyst. The oxidation catalysts used for making maleic acid indicated in the literature include more especially oxides of vanadium and molybdenum which are used in admixture with varying amounts of other metal oxides. The literature also indicates that the catalysts may be admixed with phosphorates or phosphoric acid.

The present invention provides a catalyst for the oxidation of olefins and/or diolefins having 4 carbon atoms in a straight chain which substantially improves the yield of dicarboxylic acids obtained. The invention also provides a process for the manufacture of a catalyst for the purpose indicated and an improved process for the oxidation of olefins having at least 4 carbon atoms in a straight chain to dicarboxylic acid by means of the catalyst defined hereinbefore. More especially, the present invention provides a catalyst for the purpose indicated which is made from vanadium pentoxide, phosphoric acid and an inert carrier material.

The catalyst is prepared by first reacting vanadium pentoxide with phosphoric acid and then mixing the reaction product obtain, i.e., when the reaction is complete, with an inert carrier material.

Vanadium pentoxide reacts spontaneously with phosphoric acid with evolution of heat provided that phosphoric acid of sufficient concentration is used. Fine-powdered vanadium pentoxide stirred into concentrated (syrupy) phosphoric acid involves the formation of an initially thin mass which becomes thicker and more viscous within a few minutes and then no longer stirrable; after about 15 minutes, it is substantially completely hard. Such solidification is associated with the evolution of considerable reaction heat which may involve temperature increases of far above 100° C., depending on the amount of hard cake obtained. It is supposed that vanadium pentoxide and phosphoric acid form a compound of the type of heteropolyacids which specifically catalyze the formation of dicarboxylic acids from olefins. This catalytic effect is substantially greater than that exerted by a mixture comprising the same but unreacted components.

When it is intended to produce the phosphoric acid/vanadium pentoxide-compound with evolution of exothermal heat, it is suggested that a fairly concentrated phosphoric acid, for example of 85% strength, be used. Water, which may have been added, is of no special importance, but the concentration of the phosphoric acid should not be less than 50%.

When dilute acids are used, for example acids of less than 50% strength, or when large amounts of concentrated phosphoric acid are used, it may be necessary to heat the thinly liquid mass for some time, e.g., ¼ to 2 hours, to a temperature above room temperature but below 200° C., before the reaction sets in. Alternatively, the reaction may be completed by keeping the reaction mixture warm for a prolonged time, for example, 12 to 36 hours, on a steam bath or in a warming cabinet or by any other suitable means. In this case, it is advantageous to wait until the exothermal reaction has subsided which may take some hours.

The greenish coloration and the fatty lustre of the resulting product would appear to indicate that a chemical reaction between vanadium pentoxide and phosphoric acid has taken place. A fresh mixture prepared from the unreacted components shows the brownish coloration of vanadium pentoxide unless it contains any other strongly coloring ingredients.

The product obtained by reacting vanadium pentoxide with phosphoric acid is allowed to cool, then comminuted into powder form, mixed with the carrier material and shaped in known manner, for example on an extruder or a tabletting machine. The product may, however, also be applied to pre-shaped carrier particles.

Before the reaction product of vanadium pentoxide and phosphoric acid is brought into contact with the carrier material, a further amount of phosphoric acid or sufficient water should be admixed, if necessary, in order to obtain a pulp or other processable mass. Such subsequent addition after the reaction is complete is substantially harmless.

The carrier material may be porous or not and pre-shaped, if desired. It may be impregnated or coated with the reaction product of this invention or the reaction product may be incorporated into the carrier material with the aid of an auxiliary or binding agent, such as graphite. The carrier materials used in this invention include solid inorganic silicates, oxides or carbides which under the reaction conditions do not chemically react with the catalyst or the olefins or the molecular oxygen-containing gas used for oxidation. There may be mentioned more especially, for example: kieselguhr, porcelain, silica gel, pumice, aluminum oxide, titanium dioxide, zirconium dioxide, silicon carbide, or mixtures thereof.

When it is intended to prepare a catalyst containing a great proportion of phosphoric acid, it is not absolutely necessary to react the entire amount of phosphoric acid with vanadium pentoxide but only that part thereof which is required to obtain the above reaction product, i.e., about 1.5 to 2.5 times the amount by weight of 85% phosphoric acid, calculated on vanadium pentoxide. Such procedure involves the advantage that the cake obtained can be very readily comminuted after the reaction is complete. The remaining phosphoric acid may then be added before the reaction product is admixed with the carrier material. In order to facilitate the comminution of the cake, it may be advantageous to add either to the vanadium pentoxide or to the phosphoric acid or to both or to their mixture before the reaction is complete a small amount, e.g., 2–5% (calculated on the whole amount to be added) of a carrier material as defined above.

The catalysts prepared according to this invention can be used for oxidizing olefins and/or diolefins having 4 carbon atoms in a straight chain to the corresponding olefinically-unsaturated dicarboxylic acids or their anhydrides. Thus, for example, butene-1, cis-butene-2, transbutene-2, butadiene or mixtures of these substances, if desired further admixed with isobutene, n-butane or isobutane, can be oxidized to maleic acid, or 2-methyl-butene-2 to citraconic acid. The reaction conditions under which the above oxidation is carried out are the same as described for similar known catalysts.

The oxidation is advantageously carried out by passing a mixture of 0.2 to 5% by volume of one of the aforesaid olefins or an olefin mixture and 95–99.8% by volume air or another molecular oxygen-containing gas for a period of between about 0.05 to 1 second (residence time) over a catalyst heated to a temperature of about 300 to 600° C.

The reaction products of vanadium pentoxide and phosphoric acid used according to this invention as active constituent also influence, depending on the carrier material used, the solidity properties of the finished catalyst in further bonding together the inert particles. Further consolidation of the catalyst can be obtained by heating it before its being used for about ¼ to 12 hours or any other appropriate period of time to a temperature of about 200 to 500° C. advantageously 300 to 400° C.

The ratio by weight of vanadium pentoxide to phosphorus pentoxide in the finished catalyst may vary within the limits of 1:0.5 and 1:4, preferably 1:1 and 1:2.5. Depending on the type of carrier material used, optimum results are obtained within these limits.

The following examples serve to illustrate the invention, but they are not intended to limit it thereto:

*Example 1*

28 g. finely ground vanadium pentoxide were stirred at room temperature with 92 g. 85% phosphoric acid. The mixture reacted automatically with evolution of heat. The initially stirrable then kneadable past solidified more and more until finally a solid cake was formed. The cake was allowed to stand overnight, ground and intimately mixed with 234 g. kieselguhr. The resulting mixture was wetted with a small amount of water and shaped in an extruder into cylindrical particles.

The catalyst so prepared was introduced into a tube and used for the oxidation of the following gas mixture:

| | Percent by volume |
|---|---|
| Butadiene | 42 |
| Butene-1 | 18 |
| Trans-butene-2 | 7 |
| Cis-butene-2 | 2.6 |
| n-Butane | 7.4 |
| Isobutane | 1 |
| Isobutene | 22 |

The oxidation conditions were as follows: temperature at the outside wall of the tube: 480° C.; residence time over catalyst: 0.3 second; concentration of the gas mixture in air: 1.2% by volume. 80.5 kg. maleic acid were obtained from 100 kg. of the above gas mixture. A mixture prepared by merely admixing the components, i.e., vanadium pentoxide, kieselguhr and phosphoric acid without chemical reaction, yielded under identical conditions only 62.2 kg. maleic acid from 100 kg. gas mixture.

*Example 2*

26 g. vanadium pentoxide were allowed to undergo complete reaction with 50 g. 85% phosphoric acid in the manner described in Example 1 and the resulting, finely ground greenish reaction product was mixed with 150 g. high temperature-calcined powdered aluminum oxide and 5 g. graphite as binding or sliding agent. The mixture so obtained was then tabletted on a tabletting machine into tablets of about 5 mm. in diameter which were calcined at 360–400° C.

The catalyst so obtained was used for oxidizing at 495° C. the gas mixture defined in Example 1 under the conditions specified in that example. 75 g. maleic acid were obtained from 100 kg. gas mixture.

*Example 3*

42 g. vanadium pentoxide were stirred with 95 g. 50% phosphoric acid and the resulting mixture was maintained for about 3 hours at 100° C. on a steam bath. The mixture had then completely reacted. It was mixed in a kneader with 234 g. kieselguhr (grade 0 12 of Deutsche Kieselguhrwerke, Hannover, Germany) and the mixture was shaped in a meat mincer into small sausages 5 mm. thick. The mass was dried at 100° C. and heated for 1 hour at 360–380° C. in the presence of air. The catalyst particles assumed a grey appearance and became very hard. The catalyst so prepared was used for oxidizing butene-1 contaminated with about 2% butene-2. 89.0 kg. maleic acid were obtained from 100 kg. butene under the following conditions: temperature of heating bath: 390° C.; residence time: 0.5 second; 1.5% by volume butene in air. When pure butadiene was used instead of butene-1, 107.6 kg. maleic acid were obtained from 100 kg. butadiene under identical conditions.

*Example 4*

1.8 kg. vanadium pentoxide and 3.25 kg. 83% phosphoric acid were stirred together in a dish of stainless steel. The mixture warmed up slightly and became increasingly thicker so that it could no longer be stirred after about 5 minutes. The temperature in the solidified mass rose within 36 minutes to 96° C., while the coloration turned from yellow-brown to green. The mixture was allowed to stand overnight to undergo complete reaction, the resulting lump was comminuted and intensely mixed with 10 kg. kieselguhr. 8 liters water were added and the whole was made into small sausages in a meat mincer. The sausages, having a diameter of 5 mm., were cut about 1 cm. long, dried and heated as described in Example 3. About 25 liters finished catalyst were obtained.

76.2 kg. maleic acid were obtained from 100 kg. of the hydrocarbon gas mixture defined in Example 1 under the following conditions: furnace temperature: 380° C.; residence time: 0.3 second; concentration of gas mixture in air: 1.3% by volume. Carbon monoxide, carbon dioxide, formaldehyde, acetic acid and small amounts of acrylic acid were obtained as by-products.

*Example 5*

1.8 kg. vanadium pentoxide were stirred with 3.25 kg. 83% phosphoric acid until after some minutes a thick, difficultly stirrable mass was obtained. 3 liters water were added so rapidly that the mass remained still stirrable in spite of the progressing reaction. The reaction was terminated by heating for 3 hours on the steam bath. The resulting mixture was admixed with pumice, 6 liters water were added and the whole was shaped and processed as described in Example 4.

The catalyst used under the conditions specified in Example 4 yielded 74.4 kg. maleic acid from 100 kg. $C_4$-mixture.

We claim:
1. The method of making a catalyst for the oxidation of an olefin having four carbon atoms in a straight chain to an olefinically unsaturated aliphatic dicarboxylic acid, which method comprises reacting vanadium pentoxide with aqueous phosphoric acid, while maintaining temperatures below 200° C., in amounts corresponding to a weight ratio of vanadium pentoxide to phosphorus pentoxide between 1:0.5 and 1:4 in said catalyst, and then combining the reaction product with a solid inert carrier material selected from the group consisting of kieselguhr, porcelain, silica gel, pumice, aluminum oxide, titanium dioxide, zirconium dioxide, and silicon carbide.

2. The method as in claim 1 wherein 1 part by weight of vanadium pentoxide is reacted with from 1.5 to 2.5 parts by weight of phosphoric acid calculated as 85 percent aqueous acid, the percentage being by weight.

3. The method as in claim 1 wherein said aqueous acid is at least 50 percent aqueous phosphoric acid, the percentage being by weight.

4. The method as in claim 1 wherein said vanadium pentoxide and aqueous phosphoric acid are reacted without heating.

References Cited by the Examiner

UNITED STATES PATENTS

| | | | |
|---|---|---|---|
| 2,294,130 | 8/1942 | Porter | 252—467 X |
| 2,470,190 | 5/1949 | Schmerling | 252—437 X |
| 2,569,092 | 9/1951 | Deering | 252—437 X |
| 2,656,322 | 10/1953 | Eberle | 252—435 |
| 2,656,323 | 10/1953 | Bielawski | 252—435 |
| 2,691,037 | 10/1954 | Bellringer et al. | 252—435 X |
| 2,773,838 | 12/1956 | Reid | 252—437 |
| 2,773,921 | 12/1956 | Rylander et al. | 252—435 X |
| 3,065,264 | 11/1962 | Koch et al. | 260—533 |
| 3,076,842 | 2/1963 | Jason et al. | 260—533 |

MAURICE A. BRINDISI, *Primary Examiner.*